Dec. 3, 1957　　　　　　　　　M. MAUL　　　　　　　　　2,814,986
PRINTING PERFORATED RECORD CARD CONTROLLED MACHINES
Filed May 11, 1954　　　　　　　　　　　　　　　　　7 Sheets-Sheet 1
*Fig. 1*
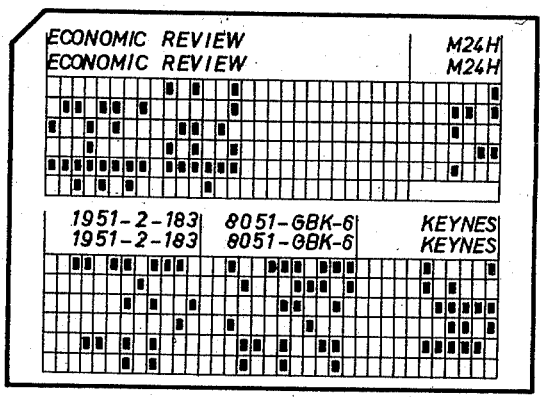
*Fig. 2*
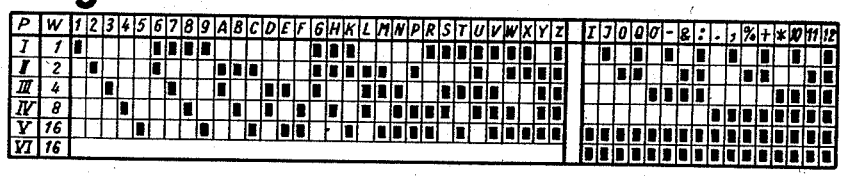
*Fig. 3*
*Fig. 4*
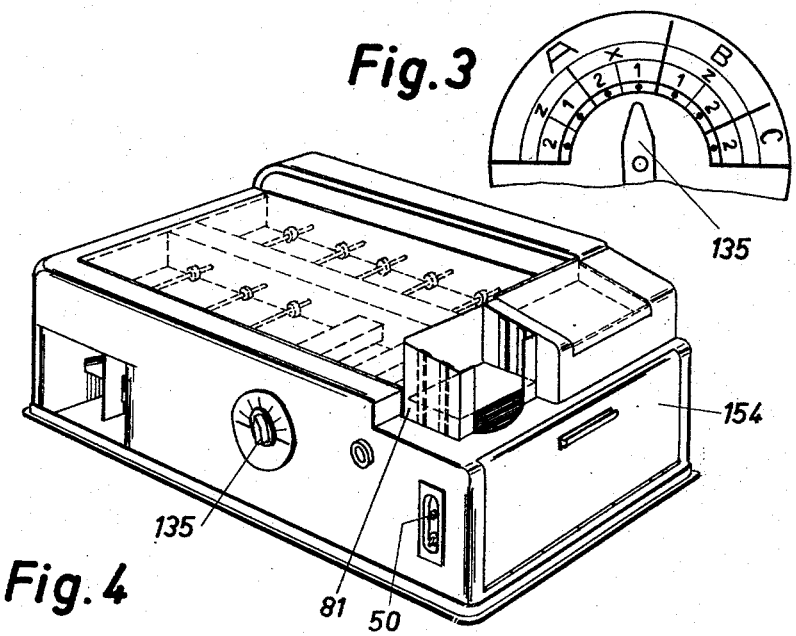
Inventor:
Michael Maul
BY:

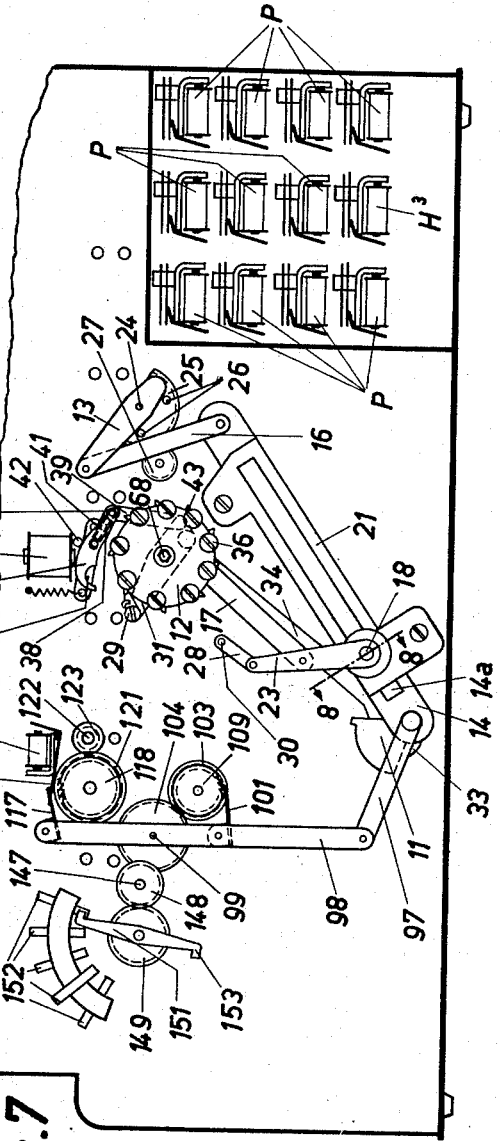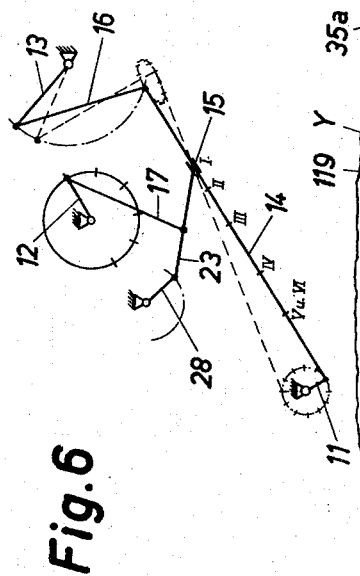

Dec. 3, 1957  M. MAUL  2,814,986
PRINTING PERFORATED RECORD CARD CONTROLLED MACHINES
Filed May 11, 1954  7 Sheets-Sheet 3
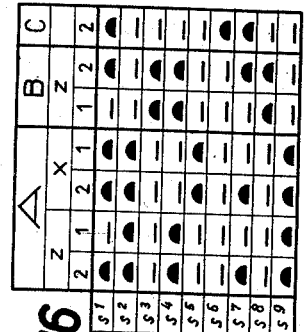
Fig.16
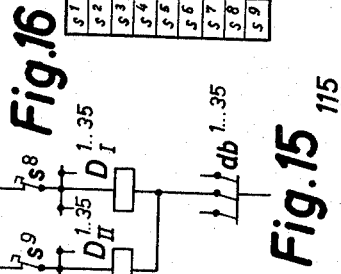
Fig.15
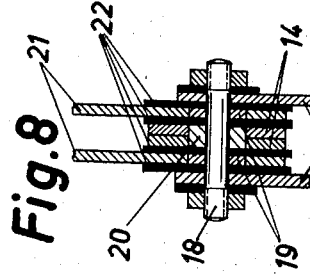
Fig.8
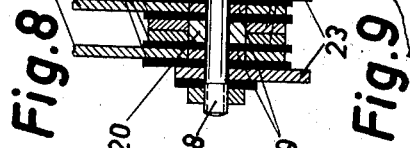
Fig.9
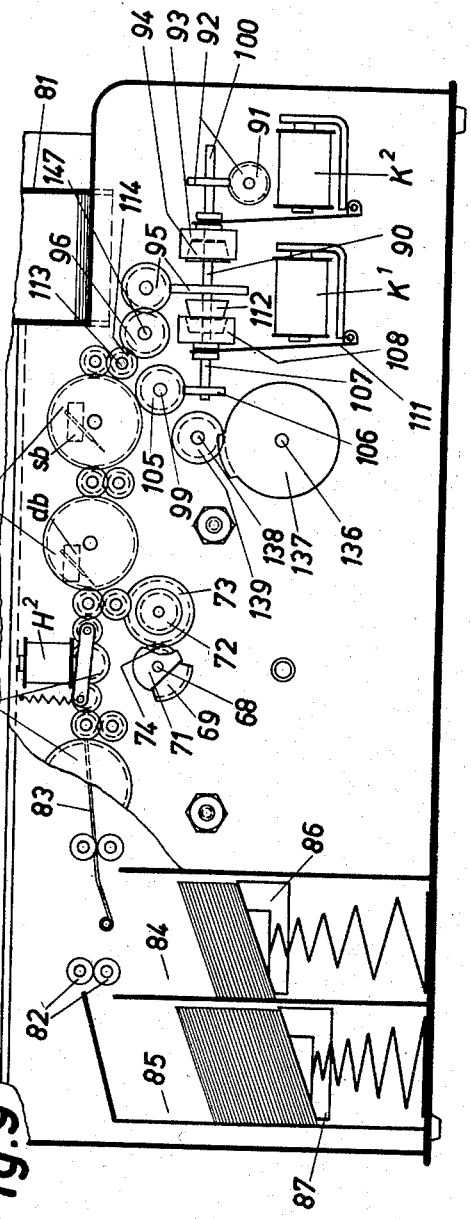
Inventor:
Michael Maul
BY:

Dec. 3, 1957  M. MAUL  2,814,986
PRINTING PERFORATED RECORD CARD CONTROLLED MACHINES
Filed May 11, 1954  7 Sheets-Sheet 4

Inventor:
Michael Maul
BY:

Dec. 3, 1957.  M. MAUL  2,814,986
PRINTING PERFORATED RECORD CARD CONTROLLED MACHINES
Filed May 11, 1954  7 Sheets-Sheet 5

Inventor:
Michael Maul
BY:

Dec. 3, 1957
M. MAUL
2,814,986
PRINTING PERFORATED RECORD CARD CONTROLLED MACHINES
Filed May 11, 1954
7 Sheets-Sheet 6
Fig.12
Fig.13
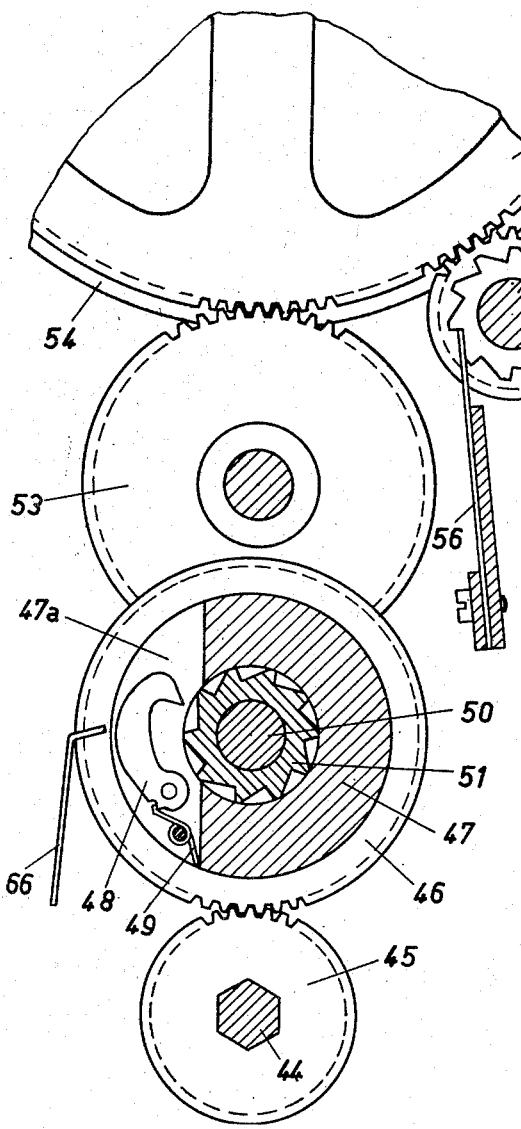
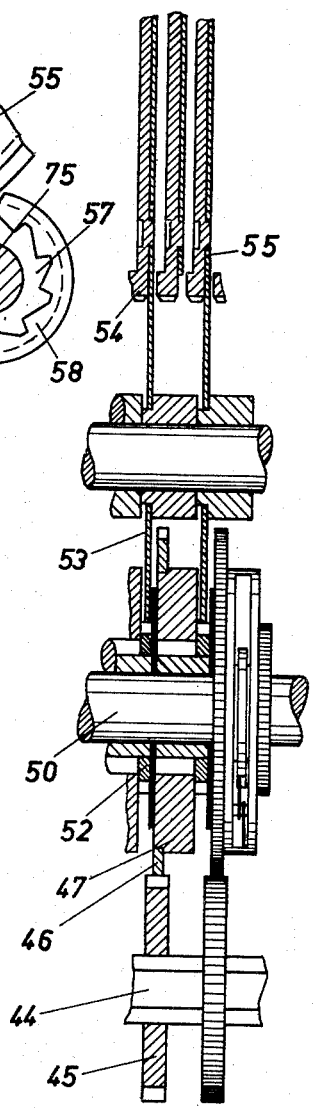
Inventor:
Michael Maul
BY:

United States Patent Office 2,814,986
Patented Dec. 3, 1957

2,814,986

PRINTING PERFORATED RECORD CARD CONTROLLED MACHINES

Michael Maul, Schwabach, near Nurnberg, Germany

Application May 11, 1954, Serial No. 429,098

Claims priority, application Germany May 19, 1953

16 Claims. (Cl. 101—93)

The modern art of punched cards gains increasingly broader fields of application. One of the most modern fields is the field of the so called "information searching by machinery" by means of punched cards.

Information searching by machinery means the collection of informative material (for instance obtained from publications) and classifying of the material in a mechanically perceivable way according to certain points of view in such a manner that according to these points of view the material can be searched by devices or by machinery. The range of application of information searching by machinery extends to all fields of human knowledge.

In the chemistry of metal compounds it is for instance possible to manifest all necessary data of all publications by perforations on punched cards, preparing one punched card for each publication. By the perforation, for instance, the title of the journal and the author, the depository of the publication, and above all, the classification of the contents are expressed according to predetermined aspects. The classification is made according to a predetermined code, for instance in such a manner that a hole in a predetermined hole position indicates a metal contained in the alloy while other hole positions are associated with other metals; that further on certain holes may be provided for the different ranges of melting points and on the other hand other holes for the acidfastness, corrosion resistance, etc. All compounds which have a definitely determined combination of features searched for will therefore be provided with the same perforations in the associated classification field of the punched card. Now, a printing punched card controlled machine may be preset to each individual feature as well as to each combination of features, and from the cards passing through the machine only those are selected and/or printed which contain the feature searched for or the combination of features searched for. Accordingly, by machinery a roster of all those publications is obtained treating the subject searched for and the scientist may now produce these publications and may study the same in detail.

The present invention provides a particularly advantageous development of punched card controlled searching machines of the indicated type. According to the invention a manually settable device for the manner of operation is provided by which in the one position of this setting device (searching position) a selector mechanism is switched in, responding to the cards having holes to be searched for, under the control of which selector mechanism only the selected cards control the printing mechanism, the setting of which is printed upon rosters of search (for instance on a continuous sheet). In a further position for the manner of operation which may be designated by perforation interpreting position, however, all cards running through the machine and passing the same analyzing device control the printing mechanism and the setting of the latter is always printed upon the associated punched card.

The advantage of the device according to the invention consists in that in one and the same machine, perforation interpreting on the card itself and information searching with printing, for instance upon a continuous record sheet, may be effected. As is well known, perforation interpreting is understood as printing of the card with the characters corresponding to the perforation, the printing device being automatically controlled in this manner of operation by these perforations. Such perforation interpreting is not dispensable in a system applying machinery for mechanical information searching since the cards are also frequently used as index cards and since in this instance it is desired to have the characters also printed in so called "plain text" on the card.

Accordingly, when applying the invention the whole set for information searching consists of only a hand punch and the machine according to the invention. After perforation of the cards the machine may be set at first to the one manner of operation in which all cards running through the machine are printed upon. This printing may also be compared with the original data in order to verify the correctness of the perforation. The usual application of a particular verifying machine for the holes is therefore also superfluous. For the purpose of searches, i. e. for the searching and printing of cards (having predetermined features or combinations of features) upon a sheet the machine may then be set to the other position of operation (searching position). The desired features or combinations of features may be preset on a key board. Only those cards of the whole informative material are selected and printed upon a sheet which show the feature or the combinations of features being preset on the key board.

Further preferred features of the invention consist in that the machine permits also additional settings to other manners of operation. Thereby the range of application of the machine is still more increased. To these features belong above all the separate deposition of the cards determined by the selector device into a search pocket while all remaining cards run into a pocket for the remaining cards. In connection with this device various manners of operation are obtained as they are indicated more in detail in the specification and in the claims.

For printing upon the controlling punched cards proper and for printing of the selected cards upon so called roster records (such as for instance upon a continuous sheet) two separate printing sections may be used which can be selectively rendered effective in the manner according to the invention by the means for selecting the manner of operation. In a preferred embodiment of the invention, however, only a single common printing device for the two manners of operation is necessary which may be set selectively by the setting device for the manner of operation either to the printing position with regard to the roster records or to a second printing position with regard to the punched cards.

Preferably, in the last mentioned embodiment the printing device is operatively connected to a switching drum for the remaining positions of operation in such manner, that the printing mechanism proper is settable only to one of two terminal positions, whereas the switching drum may be further turned beyond each terminal position and causes there the setting of the various other mentioned manners of operation.

In the accompanying drawings an embodiment of the invention is shown having a common printing device for the two positions of operation.

Fig. 1 shows a punched card as it is used in the machine.

Fig. 2 shows the perforation code according to which the cards are punched and according to which the printing mechanism is operating.

Fig. 3 shows diagrammaticaly the indicating disk on the switching drum.

Fig. 4 shows a perspective general view of the machine.

Fig. 5 shows the development of the switching drum from which may be seen the arrangement of the cams.

Fig. 6 shows a diagram of the crank drive.

Fig. 7 shows the rear view of the machine with the cover being removed from which may be particularly seen the arrangement of the crank drive.

Fig. 8 shows a section through the crank drive according to sectional line 8—8 of Fig. 7.

Fig. 9 shows a front view of the machine with the cover being removed.

Fig. 12 shows a section through the printing mechanism drive and through the clutch system transversely of the axis.

Fig. 13 shows a section through the printing mechanism drive and through the clutch system longitudinally of the axis.

Fig. 15 shows the modified part of the wiring diagram for a further embodiment.

Fig. 16 shows the development of the switching drum for the wiring diagram including the modification according to Fig. 15.

*Punched card*

Figure 10:
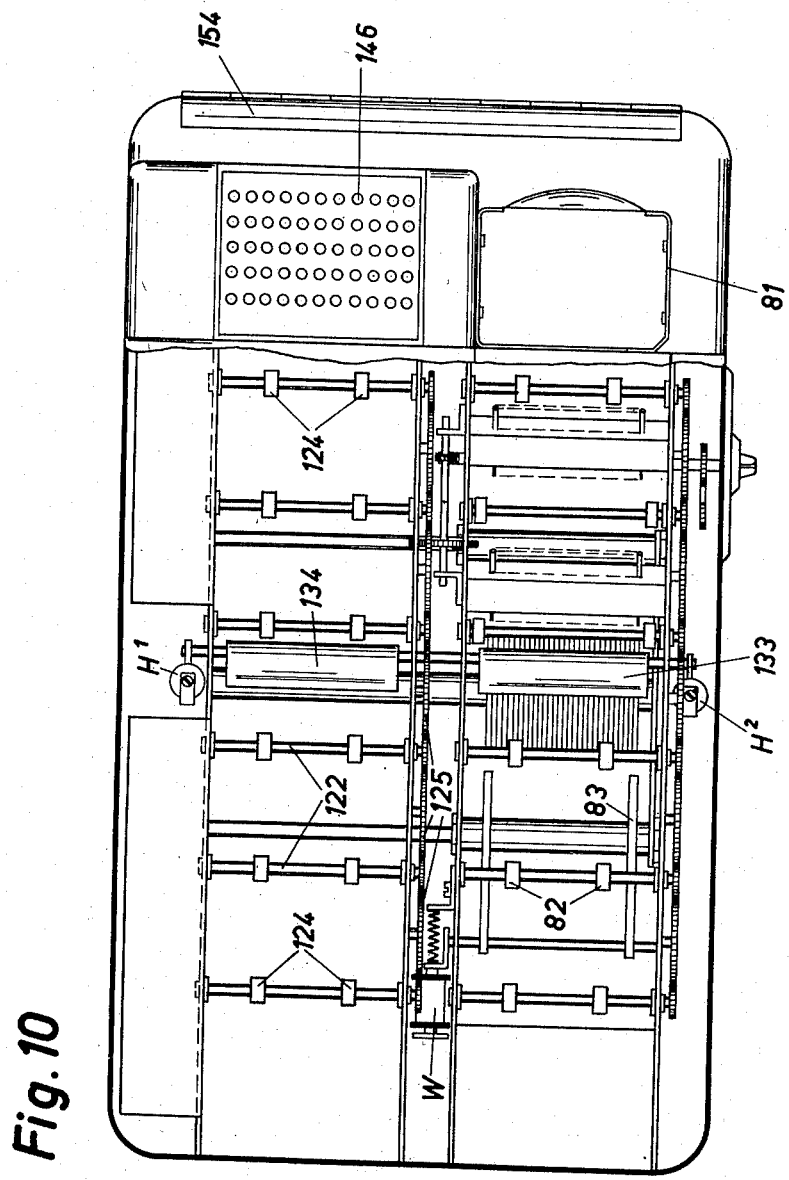
Fig. 10 shows the machine in plan with the cover being partially removed.

The punched card illustrated in Fig. 1 consists of two perforation decks each comprising 35 perforation columns. Said card is divided into various perforation fields. The left hand upper perforation field of the upper deck contains the title of the publication. The left field of the lower deck contains for instance the publishing date, the medium field indicates symbolically the depository of the publication and the right field indicates the name of the author.

In the right field of the upper deck each hole position indicates a predetermined feature. For instance in an economic scientific publication one position may indicate monetary concerns, another position conditions to the soil, a third one unemployment etc. If the publication relates to one or a plurality of these features the respective hole position is punched. Since in the card in Fig. 1 there are provided seven columns it is there possible to record $7 \times 5 = 35$ different single features. The number of columns may, however, still be increased since the capacity of the machine described hereafter amounts even to 11 rows of keys comprising each 5 features, accordingly 55 features. If required the number of rows of keys may be still further increased. The perforation field at the right hand end of the upper deck of the card according to Fig. 1 indicates therefore that the publication in the journal "Economic Review" which is identified in the lower deck, relates to a number of features. The meaning of each individual hole results from the mentioned code which of course may be different for each branch of knowledge.

In this manner of marking only 5 positions are applied. In the latter there are 31 different perforation characters possible of which each can be used for searching. This combination of holes, however, may now at the same time be represented by one of the first 31 characters in Fig. 2. Accordingly, one gains the possibility to characterize the searched combination of features also by written characters as for instance in the present case by M24H.

In the card according to Fig. 1 over each deck there are indicated two lines of written characters. This originates from that circumstance that it is assumed that the lower line of written characters is at first printed on a blank card by means of the typewriter and that according to these data on the blank card punching in the punching machine is effected. These cards may now run through the machine according to the invention in a first run in which the machine is set to "perforation interpreting." In this run then in each deck the upper line of written characters is printed on the card. By comparing the lower line of written characters representing the original entering with the upper line of written characters derived from the perforations it may then easily be determined whether the card has been punched in the correct manner. An additional verification of the perforation by means of a perforation verifying machine is therefore not necessary.

*General construction*

The machine is so constructed that it may be used for printing upon record sheets as well as for printing upon punched cards which control the machine. For this purpose the feeding devices for the cards and for the sheet are adjacent to each other. Below the same there is located the printing device which may be set below the path of the sheet as well as below the path of the cards.

A device which compares the perforations of the cards in the searching columns with the key board being set to the desired searching features selects the cards agreeing with said key setting which cards in turn control the printing device which prints the data of the cards upon a sheet. After the cards have passed the machine they may all run into one card receiver or the selected card may be deposited separately into a second card receiver.

The following seven different manners of operation may be set by the turning knob 135 of the switching drum of the machine:

(1) Sheet printing from all cards and simultaneous selecting of predetermined cards with separate deposition of the latter.
(2) Sheet printing from all cards and deposition of the latter in a single pocket.
(3) Sheet printing of selected cards and separate deposition of the latter.
(4) Sheet printing of selected cards and deposition of all cards in a single pocket.
(5) Printing upon all cards (perforation interpreting) and deposition of all cards in a single pocket.
(6) Printing upon all cards and simultaneous selection of predetermined cards with separate deposition of the latter.
(7) Selection of predetermined cards only and separate deposition of the latter without any printing.

The various setting positions may be seen from Fig. 3 and the manner of operation in each position will follow from the following schedule:

| A=Sheet printing | | B=Card printing | C=without printing |
|---|---|---|---|
| z=from all cards | x=of the selected cards | z=upon all cards | |
| 2 | 1 | 2 | 1 | 1 | 2 | 2 |

1=All cards together in one pocket=1-pocket-deposition.
2=Selected cards separately deposited=2-pocket-deposition.

*Printing mechanism*

The control of the printing mechanism is effected according to the code illustrated in Fig. 2. The code has been so provided that the searching device is under the supervision of the upper five positions, which means that it is only controlled by the 31 perforation characters within these positions, which are comprised in the left part of Fig. 2. The printing mechanism, however, is controlled by all 6 positions. The positions designated by Roman numerals I to VI are indicated in the column P and partial values 1, 2, 4, 8, 16, 16 in the column W. The position of a character within the row of characters or on the type wheel is determined by the numeral signification of the hole combination which results from the total of the partial values.

The printing device consists of a row of adjacent type wheels. There is a common drive provided for all type wheels to which the type wheels may be clutched. Clutching takes place as soon as a hole has been detected in the analyzed position. Unclutching is effected automatically as soon as the type wheel has been adjusted to the corresponding value and the card is moved to the next hole position. Printing will only take place if all six positions of a column have been analyzed. Accordingly, clutching can be effected for each position and unclutching will automatically take place past each position wherever clutching has been effected. In this way it is possible that the type wheel may be adjusted several times before printing takes place.

The drive is provided in such a manner that its displacement is varied from position to position except between the two lowermost positions. If several holes are provided in a column the displacement determined by their values will be added one by one. If it is assumed for instance that the third and fifth position of a column are punched the type wheel will be moved upon the analysis of the position III through 4 units and upon analysis of the position V through 16 units. Upon analysis of the positions I, II, IV, VI no movement takes place since there was no hole provided in the same and consequently a clutching operation has not occurred. Accordingly the type wheel had been moved for 20 units which according to the code corresponds to the character E.

The machine is provided with 35 printing positions corresponding to the 35 perforation columns of a deck. The drive for the printing device is effected by a crank drive. The operation of the crank drive is diagrammatically illustrated in the operating diagram in Fig. 6.

The crank 11 is continuously driven with constant speed in counterclockwise direction. During each turn of the crank the card is advanced for one position.

Upon each full revolution of the crank 11 the crank 12 is displaced one step in counterclockwise direction. A rod 14 is pivoted to the crank 11, said rod being mounted for reciprocating movement in the guide 15. (This guide is only symbolically indicated in Fig. 6 while actually it is constructed differently therefrom.) The right hand end of rod 14 describes an ellipse-like curve. If the guide 15 is moved the curve will change. At the left hand end of the rod 14 there is a rocker 13 connected thereto by the link 16 which latter rocks in accordance with the curve. The angle through which the rocker 13 swings is dependent upon the shape of the curve. The Guide 15 is now moved in such a way as to cause the various angles of swing of the rocker 13 to be proportioned to each other in the same manner as the values according to Fig. 2. In all five positions (the sixth position is identical with the fifth position) a constant angle must be subtracted in which the rocker runs idle on account of the play between the gears, and other parts.

The position and dimensions of the crank drive have been chosen in such a manner that in the one dead centre of the rocker 13 the guide 15 as well as the auxiliary crank drive co-operating therewith (described later) may be adjusted without changing the position of the rocker 13. This is necessary since the clutch for the clutching of the registering places to their drive must be always in the same position independently of the position in which the guide 15 happens to be. It is only necessary to take care that the guide 15 has already reached the positions (indicated in Fig. 6 by Roman numerals in accordance with the hole position designation) associated with the analyzing positions of the hole positions at the second dead centre of the rocker 13 (indicated in dash lines in Fig. 6) since the position of this point determines the amount by which the type wheel will be advanced.

The adjustment of the guide 15 is effected by the crank 12. The latter makes one revolution for each card deck. Dimensions and position have been chosen here in such a manner that the unequal distance between consecutive positions of the guide 15 on the rod 14 are transformed into equal movements of the crank 12.

As may be seen from Fig. 2 the same value 16 has been provided for the positions V and VI. The position of the crank drive for these two positions must result, as has been indicated above, in twice the same displacement though the crank 12 is turned for one step. This is obtained by reason of the fact that in the VI-position the link 17 gives the same position for the guide 15 as in the V-position.

Construction of the crank drive

The actual construction of the crank drive is shown in Figs. 7 and 8. The rod 14 consisting of two adjacent metal sheets is linked to the crank 11. It has a rectangular cut out portion 14a in which can slide a guide piece 20 (Fig. 8). The guide piece 20 is loosely seated and rotatable upon the pivot pin 18. On the pin 18 there are further mounted the two loose guide pieces 19 adapted to slide in the guide bars 21 which are provided on both sides of rod 14 and are fast to the base plate. As a protection against mutual interference of rod 14 and the guide bars 21 and, in order to prevent the guide pieces from sliding off, disks 22 are provided between the guide pieces 20 and 19. The arrangement of the guide pieces permits sliding of the pin 18 in the guide bars 21, sliding of the rod 14 on the pin 18 and rocking of the rod 14 relatively to the fixed guide bars 21 about the axis 18. The displacement of the guide pieces is effected by the two links 23 which are screwed fast to the pin 18. At the left hand end of the rod 14 the rocker 13 is connected by the link 16. The rocker 13 is rotatably mounted on the stud 24 which is fast to the base plate and upon which also the toothed segment 25 can turn. The rocker 13 can take the toothed segment 25 with it by engaging the two stops 26. The position of the stops has been chosen in such a manner that upon the change of direction the rocker 13 moves idly through a certain angle with respect to segment 25. This idle movement is necessary in order that when clutching of the registering mechanism takes place (as before mentioned) at the one dead centre, the drive is stationary. The toothed segment 25 meshes with the pinion 27 from which the drive for the printing mechanism is derived.

The positioning of links 23 and therewith of guide 15 is effected through link 17 by crank 12 which in practice takes the form of a ratchet wheel. The rocker 28 connected to the links 23 is rotatably mounted at this right hand end on the stud 30 which is fast in the casing. The rocker 28 is necessary in order to safeguard the proper positioning of the link 23 and thereby also of the guide.

Movement of the ratchet wheel 12 is effected by pawl 29. The pawl 29 is rotatably mounted on the rocker 31 and is resiliently held against the ratchet wheel 12. The rocker 31 is driven by an eccentric 33 and the eccentric rod 34. The eccentric 33 is mounted upon the same shaft as the crank 11 so that the rocker 31 will rock back and forth once at each revolution of the crank 11. By this means the ratchet wheel 12 will be moved one step by means of pawl 29. By this movement the movement of the guide 15 is effected through rod 17 and the link 23, the rod being pivotally mounted on the ratchet wheel 12.

The position of the guiding pieces in the guide bars 21 must be exactly defined after the rocker 13 has reached the outer dead centre. This is necessary since at this moment declutching of the type wheel takes place. As indicated above, this dead centre position also indicates the value for the associated position. During the remaining time the guide may be moved, this movement having, however, no influence upon the adjustment. The position of the guide has no influence upon clutching since the crank drive and the position of the guide bars 21 have been chosen in such a manner that the position of the one dead centre is independent of the positioning of the guide.

Provision must be made that forces occurring and tending to move the guide from the predetermined position which must in no event occur at the outer dead centre, cannot have any influence. Therefore the ratchet wheel 12 is arrested at this moment and is blocked in both directions of rotation so that no unforeseen movements can arise. Blocking is effected by the lever 35 with its semicircular cut out portion 35a. The cut out portion 35a of lever 35 can engage over the screw heads 36 thus blocking the rotation of the ratchet wheel 12 in both directions. This blocking must be maintained for some time. Moreover, a quick engagement is desired which is obtained by a snap-action mechanism. The arm 37 is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of arm 37 the lever 35 will now continuously snap back and forth between the stop 42 and the screws 36. The dead centre has been positioned in such a manner that the lever 35 engages one of the screws 36 when the guide or the screws 36 respectively have reached the proper position.

In order to compensate for tolerance and play and to permit an exact adjustment of the strokes the various screws 36 or the teeth 43 of the ratchet wheel are individually adjustable. The ratchet wheel 12 is constructed as a simple disk to which each of the teeth 43 is fastened by means of a screw 36.

The six screws 36 and teeth 43 respectively that are necessary for the various positions of the guide 15 are spaced a smaller distance from each other than the remaining three. These three screws are required in order to restore the crank drive, for positioning the guide, to its home position again. During this time also printing and deck change will take place. The distance between these three screws has been somewhat increased in order that in the interval between two cards which corresponds to four normal shifting steps, only three steps may occur.

Clutch system for type wheels

Figure 11:
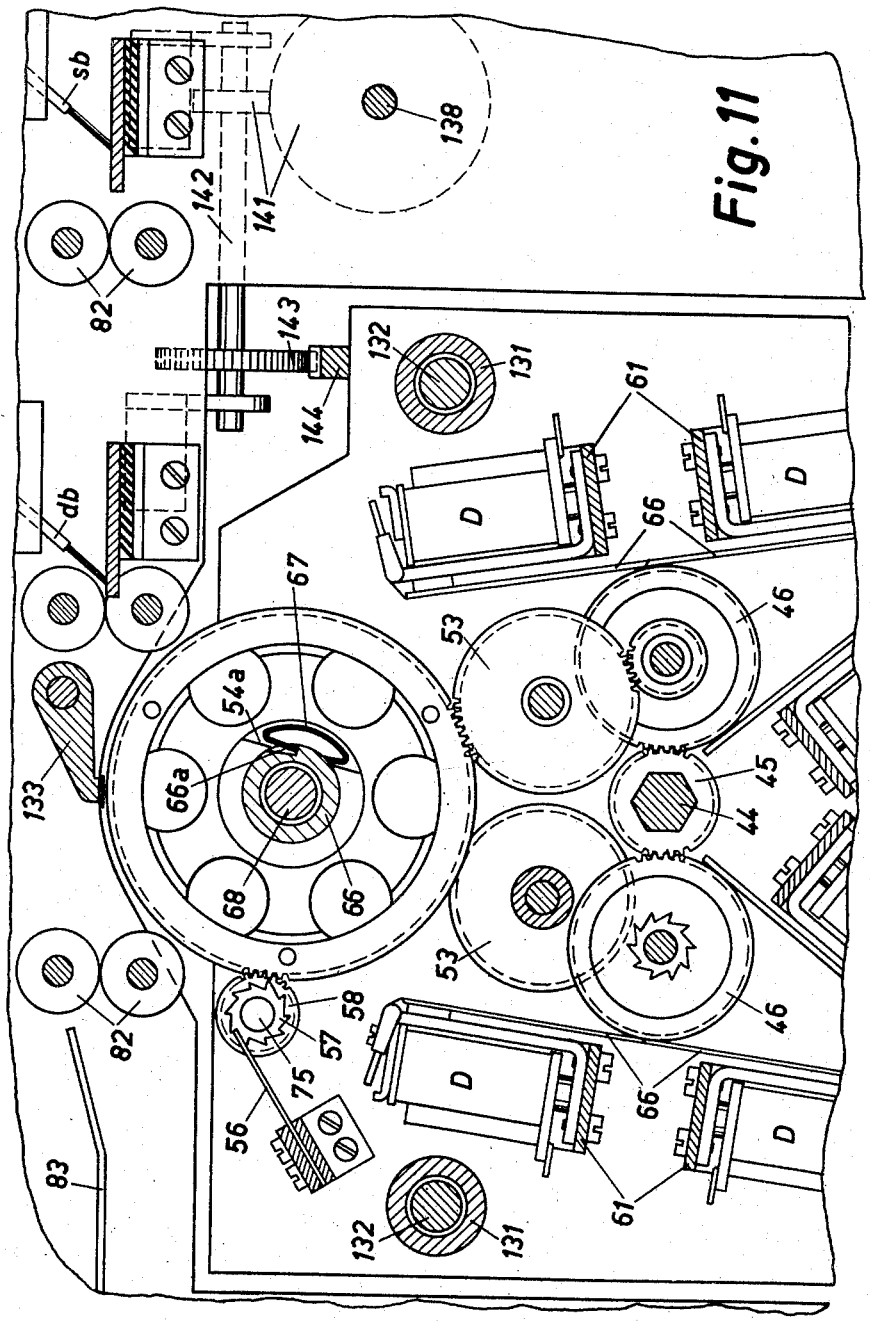
Fig. 11 shows a section through the printing mechanism.

The back and forth movement of the pinion 27 (Fig. 7) is transferred through a gear mechanism to the shaft 44 (Figs. 11 to 13). The shaft 44 is in the form of a hexagon on which a sleeve is axially movable. The sleeve carries the pinions 45. The arrangement of the wheels in Figs. 12 and 13 does not exactly correspond to the position in the machine. This arrangement has been chosen in order to permit a clearer view of the section in Fig. 13. For each type wheel a pinion 45 is provided. The latter meshes with the pinion 46 which is firmly pressed upon the ring 47. In the ring 47 there is provided a slot 47a accommodating the pawl 48 and the spring 49. By spring 49 the pawl 48 may always be held in one of two rest positions. The ring 47 only rotates upon the teeth of actuating wheel 51. To the actuating wheel 51 the pinion 52 is rigidly fixed, the latter engaging the pinion 53. The pinion 53 meshes with the pinion 55 which is rigidly connected to the type wheel 54. The actuating wheel 51 is rotatably mounted upon the shaft 50.

According to the value of the effective hole position each ring 47 driven by its pinion 45 will be rotated. If the clutch magnet has been energized slightly earlier by a hole in the card, the armature 66 will encounter the pawl 48, which will be pressed into a gap between the teeth of the actuating wheel 51, said pawl taking the wheel 51 with it in counterclockwise direction. Through pinions 52, 53 and 55 the type wheel is thereby moved accordingly. Engagement of the pawl can only occur in a predetermined position. The initial position of the pawl is determined by the crank drive as has already been mentioned above. The movement of the actuating wheel 51 always takes place for a multiple of the pitch so that the teeth will always be again in the proper position for engagement.

Upon backward movement of ring 47 the type wheel 54 and therewith gear 55 are locked against backward movement by spring 56 (Fig. 12). The spring 56 engages with a locking wheel 57 being mounted on the shaft 75, which locking wheel is fast to the gear 58, the latter meshing again with the gear 55. Accordingly, also gear 51 is blocked against rotation in clockwise direction (Fig. 12). The pawl 48 is forced outward by the inclined back face of the tooth until it reaches its outer position in which it will then be held by the spring 49. Accordingly, declutching will automatically take place right at the beginning of the backward movement. The ring 47 will now run back until the dead point for the next clutching operation is reached.

The crank drive is arranged at the rear wall of the machine in such a manner that it is easily accessible from the rear (Fig. 7). The crank 11 is connected to the motor through a gearing which is not illustrated. Accordingly, the crank drive runs continuously as long as the machine is in operation. The drive is effected from the described crank drive through pinion 27 to the hexagon shaft 44 (Fig. 11) upon which are provided the driving wheels for the clutches to the type wheels which are generally indicated at 45 for all printing places.

The magnets D are provided on the stirrups 61 (Fig. 11) which are fastened to the side walls of the machine.

The type wheels 54 are rotatably mounted upon the sleeve 66. In the type wheels there is provided a recess 54a in which engages the spring 67. The sleeve 66 is providfed with a groove 66a. Upon actuation of the type wheel the latter will rotate in counter-clockwise direction whereupon the spring 67 slides over sleeve 66. While the type wheels are being set the sleeve 66 is stationary. After printing the sleeve 66 will rotate in counter-clockwise direction. Depending upon the position of the type wheels the springs 67 are engaged by the groove 66a and will be moved by the latter whereby the type wheels are restored to their home position. The drive for the sleeve 66 will be referred to later on.

Zeroizing is effected from the ratchet wheel 12 (Fig. 7) which rotates once per deck and therewith per printing operating cycle, accordingly, twice per card passage. The ratchet wheel is rigidly mounted on the shaft 68 which is mounted in the sleeve 66 (Fig. 11). At the other end of the shaft 68 there are fastened the toothed segment 69 (Fig. 9) and the cam 71 which cam controls contact $n^6$ not being illustrated. The gear 74 is driven by a toothed segment 69 through a reduction gear with the gears 72 and 73. Gear 74 is fastened on the sleeve 66 (Fig. 11) which serves for zeroizing. The ratio of the gears as well as the dimensions and the position of the toothed segment have been chosen in such a way that zeroizing is effected in the last quarter of the printing cycle, shortly after the printing proper.

The ribbon is provided between the card and the hammer 133 or between the sheet and hammer 134 (Fig. 10). The ribbon spools are arranged at the side walls of the machine and for reasons of clarity they are, as well as their drive, not illustrated in the drawings.

When the setting of the printing device is completed the cam contact $n^7$ (Fig. 14) closes temporarily, establishing the circuit through one of the printing magnets H so that the latter is energized and the hammer is pressed against the type.

Displacement of the printing mechanism

As has been already emphasized in the introduction, the printing mechanism may be set to punched card printing or sheet printing. This is obtained by the displacement of the printing mechanism in axial direction so that the same will either be below the path of the punched cards or below the path of the sheet.

In order to effect the displacement in a simple manner the adjacent type wheels are comprised in a unit with their clutching devices. This unit is held together by the sleeves 131 (Fig. 11) and can slide over the two guide pins 132. The latter are screwed to the two side walls of the machine. If the printing device is below the card path, the printing hammer 133 is rocked against the card by responding of the magnet $H^2$ (Fig. 10) after displacement of the printing device has been effected; however, if the printing device is below the sheet path the magnet $H^1$ will rock the hammer 134 against the sheet. The displacement of the printing device is effected by the turning knob 135 of the switching drum (Fig. 4) which is firmly seated on the shaft 136 (Fig. 9). Further on the toothed segment 137 is firmly seated on the shaft 136. If the switching drum is shifted from sheet printing to card printing the toothed segment 137 engages the gear 139 which is seated on the shaft 138 and turns said gear through a certain angle. Through the pair of spiral gears 141 (Fig. 11) this turning movement is transferred to the shaft 142 having the gear 143 firmly seated thereon. The gear 143 meshes with the toothed bar 144 which is fastened to the unit of the printing device and accordingly, moves the printing device.

Card feed

The cards are inserted in the magazine 81 (Figs. 9 and 10) and are fed by the card knives past the rollers 82. The latter feed the cards past the searching brushes $sb$, the analyzing brushes $db$ for the printing device and above the type wheels to the card receivers. According to the position of the deflector 83 which is controlled by the magnet W the cards are directed to one of the two card receivers 84 or 85. If a card agrees with the presetting, the magnet W responds and the card is deposited into the magazine 84. In the card receiver the cards drop on the card support 86 or 87, respectively. When one of the two card supports has reached its lower position it opens a contact $a$ which is not illustrated, thereby rendering the entire machine stationary, as soon as a card receiver is filled with cards.

The drive of the feed rollers is effected through a friction clutch. The later has been so constructed that the feed rollers are differently driven depending upon which of the two clutch magnets $K^1$ and $K^2$ has responded: Either in the fast run from the shaft 91 driven by the motor M through the pair of spiral gears 92, the two clutch members 93 and 94, the pair of spiral gears 95 and the intermediate gear 96; or if cards are printed upon, in the normal run which is derived from the drive of the printing device (crank drive). The rocker 98 is driven by the link 97 (Fig. 7) which is connected to the crank 11. The rocker 98 is rotatably mounted on the shaft 99. On the rocker 98 is mounted the pawl 101 which drives the ratchet wheel 102. By means of the gears 103 and 104 the movement is transferred to the shaft 99. The spiral gear 105 is seated at the front side of the machine (Fig. 9) on the shaft 99, said spiral gear meshing with the spiral gear 106. The latter is rigidly mounted on the shaft 107, on which is mounted the clutch half 108. The latter is secured against torsion with respect to the shaft 107, but is movably arranged. The same applies to the clutch half 93. The latter is also movably mounted on the shaft 100 and fastened against torsion. By armature 111 of the clutch magnet $K^1$ the clutch half 108 is brought into connection with the clutch half 112 on the shaft 90, the magnet $K^1$ being at that time energized. The drive to the feed rollers is transferred from the shaft 90 through the pair of spiral gears 95 and the intermediate gear 96. The later meshes with the gear 114 fastened on the shaft 113. On the shaft 113 there are also seated the feed rollers 82. The intermediate gears 115 transfer the movement towards the gears to all feed roller shafts 113.

Sheet feed

The sheet feed is effected after each printing operation, controlled by the magnet Y. The drive is derived from the rocker 98 (Fig. 7). If the armature 119 of the magnet Y is deenergized the armature keeps the pawl 117 disengaged from the ratchet wheel 118. If the magnet Y is energized and the armature is rocked downwardly the pawl 117 may drop into the ratchet wheel 118 and advance the latter step by step. The ratchet wheel 118 is firmly connected to the gear 121. The latter drives the gear 123 on one of the feed roller shafts 122 for the sheet feed. In order to facilitate supervision of the card path and the sheet path and to permit reading of the printed characters on the sheet immediately, the plate over the card path and the sheet path is made of transparent material.

Searching device

The search key board (Fig. 10) in connection with the comparing device is so constructed that at the same time up to 11 columns may be verified. For this reason there are provided 11 rows of keys each row having five keys corresponding to the five positions of a column to be searched. The key board equipped with the keys 146 is arranged beside the supply magazine 81 (Fig. 4). The cover thereabove is made of transparent material in order to permit at any time observing of the setting of the keys. Through an impulse emitter there are always five keys of a column associated with one of the 11 verifying relays P (Fig. 7). Comprised to a unit, including the auxiliary relay $H^3$, said verifying relays are arranged at the rear of the machine.

The impulse emitter controls the comparing operation of the individual positions of the columns to be searched. Said emitter is arranged at the rear of the machine (Fig. 7) and is driven from the shaft 147 through the gears 148 and 149. The shaft 147 receives its rotating movement from the gear 96 which is mounted at the front side of the machine. Synchronously with the passage of the upper deck of a card under the searching brushes $sb$, the arm 151 of the impulse emitter slides over the five lamellas 152. When the lower deck passes the searching brushes the arm 153 slides over the lamellae 152. In those lamellae the associated keys of which are depressed, the current may further flow to one of the two windings of the verifying relay P which is provided as a differential relay. When the perforations of the card passing below the searching brushes agree with the key setting, at the same time current impulses are emitted from the searching brushes through the plug board to the other winding of the verifying relay P. The plug board is mounted below the cover 154 (Fig. 4) and has been provided to permit connecting of the 11 verifying relays to any desired brush $sb$ or to any column.

The paper roll for the sheet is also easily accessible mounted behind the cover 154, namely beneath the key board.

Cam control

The cam contacts $n^1$ to $n^4$, $n^6$, $n^9$ and $u$ (Fig. 14) are seated on a shaft which is in connection with the card feeding device and rotates once per card cycle. At the end of a card cycle the contacts $n^1$ to $n^4$ are temporarily actuated one after the other in the sequence of their indices. The task of the cam contact $n^1$ is to interrupt the holding circuit to the deflector magnet W as soon as the card to be deflected has passed the deflector. By means of the cam contact $n^2{}_I$ the holding circuit to the clutch magnet $K^2$ is interrupted so that the latter is deenergized. The cam contact $n^2{}_{II}$ closes the current circuit to the deflector magnet W provided that its circuit has been prepared by the verification. Through cam contact $n^3$ the holding circuit to the auxiliary relay $H^3$ is temporarily interrupted and the cam contact $n^4$ interrupts the holding circuit to the clutch magnet $K^1$. The cam contacts $n^6$ close as long as a deck is under the analyzing brushes. The task of the cam contacts is to establish the circuit to the brushes only as long as lasts the analysis of one deck. The cam contacts $n^9$ are temporarily closed as soon as a position is under the analyzing brushes. The cam contact $u$ serves for deck selection and is shifted upon analyzing of the second deck.

The cam contacts $n^5$, $n^7$ and $n^8$ on the other hand are in connection with the drive of the printing device. The cam contact $n^5$ closes temporarily at the beginning of a crank drive cycle and therewith establishes a circuit to the clutch magnet $K^1$, provided that a card shall be printed from. A crank drive cycle corresponds to the nine setting positions for the partial values or nine revolutions of the crank 11. The cam contacts $n^7$ and $n^8$ close temporarily at the end of the crank drive cycle or of the setting of the printing device. By the latter are controlled the printing hammer magnets $H^1$ and $H^2$ as well as the magnet Y.

Wiring

In the illustration of the wiring for the machine a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number, the relays and magnets are indicated by capitals and the contacts actuated by the latter by the corresponding small letters. Manually actuated contacts are characterized by a key-like hook on the upper end of the movable contact member.

At first the setting to sheet printing of selected cards with one-pocket-deposition shall be explained. The switching drum is herein set to the position $Ax1$ (Figs. 3 and 5) and closes the contacts $s^1$, $s^2$, $s^5$ and $s^8$.

After closing the main switch $e$, the machine will not yet start running. It is only if the start key 50 (Fig. 4) is depressed and closes its contacts $st_I$ and $st_{II}$ that the motor receives current through the two magazine contacts $a_I$ and $a_{II}$, the card lever contact $ka^1$ and the start key contact $st_I$. A further current circuit is established through the delay contact $v$, the contacts $st_{II}$, $h^3_{II}$, $s^5$, $k^2$ and through the clutch magnet $K^1$. The clutch magnet $K^1$ responds and connects the slow run for the card feed. Shortly before the first card with the first position is below the searching brushes $sb$ the card lever which operates in a known manner and is not illustrated in the drawings shifts its contact $ka^1$. The card lever contact $ka^2$, however, is only closed if a card is below the brushes $db$. The motor M receives now current through the contacts $a_I$, $a_{II}$ and $ka^1$. The start key 50 can be released whereby the contacts $st$ are again opened. However, if the key is depressed for some time, the delay contact opens before the first analyzing cycle is completed so that the cam contacts $n^4$ and $n^5$ may become effective. The clutch magnet $K^1$ does not become deenergized by opening of the delay contact since the magnet holds itself through its contact $k^1_I$ and the cam contact $n^4$.

As soon as the first position of the card is under the searching brushes $sb$ the cam contacts $n^6_{II}$, $n^9_{II}$ close so that current may flow through the brushes $sb$ having passed through a hole, the plug board $f$, through one winding of the verifying relays P, through one of the key contacts $g$, the cam contact $u$ and the contact $s^1$ to positive. The contact $g$ serves for deck selection. According to its position the verifying relay acts upon a column of the upper deck or of the lower deck. Simultaneously with the passage of the first position below the searching brushes $sb$ the impulse emitter $i$ slides over the first lamella which is connected to a key $t_I$. This key having been depressed, a current impulse flows through the contacts $n^6_{II}$, $n^9_{II}$, $t_I$, the impulse emitter $i$, through the other winding of the verifying relay P, through the key contact $g$, the deck shifting contact $u$ and the contact $s^1$ to positive. The verifying relays P are constructed as differential relays and respond if current flows only through one winding, i. e. upon non-agreement of perforation and key setting. Upon passage of the second position below the searching brushes $sb$ the impulse emitter $i$ slides over the second lamella which is connected to the key $t_{II}$, upon passage of the third position over the third lamella etc. up to the fifth one. Subsequently, deck change is effected at which time the cam contact $n^6_{II}$ opens, so that during this time current cannot flow to the comparing device. If it is assumed that the analysis of the first card results in a non-agreement between perforation and key setting, one or several of the verifying relays P have responded and have closed their contacts $p$. Coincidently with the closing the $p$-contacts the auxiliary relay $H^3$ responds and establishes a holding circuit through its contact $h^3_I$. Besides that the contact $h^3_{III}$ closes and the contacts $h^3_{II}$ as well as $h^3_{IV}$ open.

Opening of the contact $h^3_{II}$ is of no influence since the clutch magnet holds itself through the contact $k^1_I$. Upon closing of the contact $h^3_{III}$ a current circuit is prepared through the clutch magnet $K^2$. Only, if the cam contact opens temporarily, the clutch magnet $K^1$ is deenergized. Its contacts $k^1_I$ and $k^1_{II}$ open and the contact $k^1_{III}$ closes. The clutch magnet $K^2$ receives current through the contact $k^1_{III}$ and initiates the fast run for the card feed. Its contacts $k^2$ opens and keeps therewith the current circuit to the clutch magnet $K^1$ interrupted as long as the clutch magnet $K^2$ has responded. Shortly before the next analyzing cycle begins the current circuit to the relay $H^3$ is interrupted by the cam contact $n^3$. If several cards pass below the searching brushes $sb$ the perforations of which cards in the searching columns do not agree with the key setting, each time the auxiliary relay $H^3$ responds as has been already described above, and the contact $h^3_{III}$ closes again before the cam contact $n^2_I$ opens, thus maintaining the current circuit through the clutch magnet $K^2$. However, if a card arrives in which the perforations agree with the key setting the auxiliary relay $H^3$ does not respond since no verifying relay P has been energized and therewith no contact $p$ has been closed. Therefore, the contact $h^3_{III}$ remains opened and the contact $h^3_{II}$ remains closed.

If now at the end of the analyzing cycle the cam contact $n^2_I$ opens temporarily the clutch magnet $K^2$ is deenergized and interrupts the fast feed. At this time the card with its first position is ahead of the analyzing brushes $db$. Besides that the contact $k^2$ closes. The clutch magnet $K^1$ may, however, only respond if the cam contact $n^5$ closes temporarily at the beginning of the crank drive cycle. Hereby a safe cooperation between the card feed and the crank drive or the printing device is safeguarded. Upon responding of the clutch magnet $K^1$ the contacts $k^1_I$, $k^1_{II}$ and $k^1_{IV}$ close while $k^1_{III}$ opens. By closing of the contact $k^1_{IV}$ the current circuit to the printing hammer magnet $H^1$ or $H^2$ is prepared. At the end of the analyzing cycle the cam contact $n^7$ closes so that the printing hammer magnet $H^1$ receives current through the contact $s^2$ which is closed in this operating position. As described above, the magnet Y controls the sheet feed and may only receive current if $K^1$ has responded or if the machine operates in the normal run and the contact $k^1_V$ is closed. Shortly after printing due to the energization of magnet $H^1$, the cam contact $n^8$ closes thus causing the magnet Y to respond and to connect the sheet feed.

If a non-agreeing card passes the searching brushes, one or several of the verifying relays P respond, close their contacts $p$, so that the auxiliary relay $H^3$ responds again and actuates its contacts $h$. The clutch magnet $K^2$ may however, only respond if the current circuit to said magnet is closed through the contact $k^1_{III}$. Shortly before beginning of the next analyzing cycle the cam contact $n^4$ opens, the clutch magnet $K^1$ is deenergized and the contact $k^1_{III}$ closes so that the clutch magnet $K^2$ responds and connects the fast feed.

For the operating cycle sheet printing of selected cards with separate deposition of the cards printed from (switch setting $Ax2$) the machine operates in the same manner as just described, only in addition thereto the contact $s^7$ is closed by means of the switching drum and therewith the circuit for the deflector magnet W prepared. If the brushes $sb$ indicate in connection with the impulse emitter $i$ nonagreement, one or several of the verifying relays P respond. The relay $H^3$ is energized through the contacts $p$ so that the contact $h^3_{IV}$ opens and the deflector magnet W cannot receive any current upon closure of the cam contacts $n^2_{II}$. If, in turn, agreement is determined by the comparing device, accordingly, no verifying relay P responds and the relay $H^3$ is not energized. The contact $h^3_{IV}$ remains energized so that a current circuit is established through the deflector magnet W as soon as the cam contact $n^2_{II}$ closes at the end of the analyzing cycle. The magnet W establishes a holding circuit through the contact $w$ until a short opening of the cam contact $n^1$ interrupts again the current circuit.

For the operating cycle sheet printing of all cards with one-pocket-deposition the contact $s^1$ is opened in the position $Az1$ of the switching drum and the comparing device is disconnected. The contact $a^4$ is closed and the contact $a^5$ is opened, so that the clutch magnet $K^1$ receives continuously current. The machine operates therefore constantly in the normal run.

For the operating cycle sheet printing of all cards and simultaneous searching of determined cards with separate deposition of the latter (switch position $Az2$) the contact $s^1$ is closed and therewith the comparing device is connected. The contact $s^4$ is closed. Consequently, the machine operates in the normal run. By means of the contact $s^7$ the current circuit to the deflector magnet W is prepared so that said magnet responds upon agreement.

The operating cycle printing upon all cards with one-pocket-deposition (position $Bz1$ of the switch) differs from the operating cycle sheet printing upon all cards with one-pocket-deposition with respect to the wiring only in that not the contact $s^2$ is closed and the contact $s^3$ is opened but vice versa the contact $s^2$ is opened and the contact $s^3$ is closed so that the hammer $H^2$ which is provided above the card path, responds if the cam contact $n^7$ closes.

To the operating cycle printing upon all cards and simultaneous searching of determined cards with separate deposition of the latter (switch position $Bz2$) applies the same as to sheet printing from all cards and simultaneous searching of predetermined cards with separate deposition of the latter (position $Az2$), only with the difference that herein the contact $s^3$ is closed and the contact $s^2$ is opened.

For the operating cycle selection only and separate deposition of the searched cards without any printing (switch position $C2$) the contact $s^6$ is closed. The contacts $s^4$ and $s^5$ remain opened as well as the contacts $s^2$ and $s^3$. The contact $s^7$ is closed and therewith the deflector control is initiated.

If one of the two card receivers is filled with cards and is not cleared one of the two magazine contacts $a_I$ and $a_{II}$ opens and interrupts the whole current circuit so that the machine is stopped.

A further embodiment is shown in Figs. 15 and 16 in which embodiment is provided an individual printing device for each path. Fig. 15 shows the part of the wiring diagram which is modified with respect to Fig. 14, and Fig. 16 the development of the switching drum from which may be seen the cam arrangement. In this embodiment the unit of the printing device is not moved but by means of the switching drum one of the two printing devices is electrically selected for setting and printing.

Figure 14:
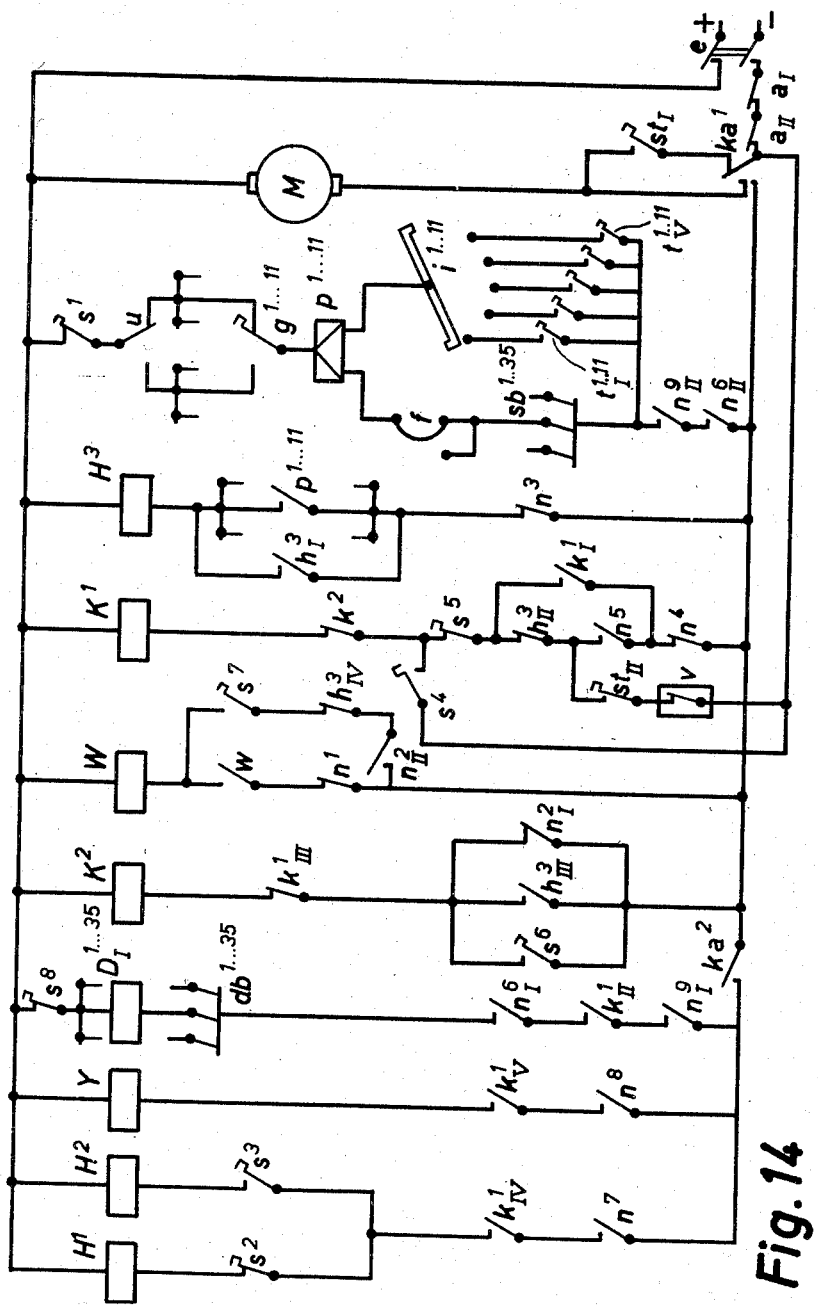
Fig. 14 shows the wiring diagram of the machine.

The wiring varies with respect to Fig. 14 only by the addition of the two contacts $s^8$ and $s^9$ which are controlled by the switching drum and control the connection to the individual printing mechanisms.

I claim:

1. In a record card controlled printing machine, in combination, means for feeding record cards bearing marks along a first path; analyzing means for said marks arranged in said first path; means for feeding a record sheet along a second path; a printing mechanism controlled by said analyzing means and being set by the same for printing data represented by marks in said record cards; control means for selectively associating said printing mechanism with each of said paths for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; and actuating means for said selecting mechanism and being connected to said control means and operated by the same to move said selecting mechanism to said operative position when said control means associated said printing mechanism with said second path, and to move said selecting mechanism to said inoperative position when said control means associate said printing mechanism with said first path so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards.

2. In a record card controlled printing machine, in combination, means for feeding record cards bearing marks along a first path; analyzing means for said marks arranged in said first path; means for feeding a record sheet along a second path; a printing mechanism controlled by said analyzing means and being set by the same for printing data represented by marks in said record cards, said printing mechanism being common to the record cards and to the record sheet and being movable between a first position located in said first path and a second position located in said second path; control means for shifting said printing mechanism between said first and second positions for seelctively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; and actuating means for said selecting mechanism and being connected to said control means and operated by the same to move said selecting mechanism to said operative position when said printing mechanism is in said second position and to move said selecting mechanism to said inoperative position when said printing mechanism is in said first position so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards.

3. In a record card controlled printing machine, in combination, means for feeding record cards bearing marks along a first path; analyzing means for said marks arranged in said first path; means for feeding a record sheet along a second path; a printing mechanism controlled by said analyzing means and being set by the same for printing data represented by marks in said record cards, said printing mechanism being common to the record cards and to the record sheet and being movable between a first position located in said first path and a second position located in said second path; control means for shifting said printing mechanism between said first and second positions for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; and automatic actuating means automatically moving said selecting mechanism to said operative position when said printing mechanism is in said second position and to move said selecting mechanism to said inoperative position when said printing mechanism is in said first position so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards.

4. In a record card controlled printing machine, in combination, means for feeding record cards bearing marks along a first path; analyzing means for said marks arranged in said first path; means for feeding a record sheet along a second path; a printing mechanism controlled by said analyzing means and being set by the same for printing data represented by marks in said record cards, said printing mechanism being common to the record cards and to the record sheet and being movable between a first position located in said first path and a second position located in said second path; control means for shifting said printing mechanism between said first and second positions for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism; means for automatically rendering said selecting mechanism ineffective when said printing mechanism is in said first position; and means for rendering said selecting mechanism effective when said printing mechanism is in said second position for printing all record cards passing said analyzer means.

5. In a record card controlled printing machine, in combination, means for feeding record cards bearing marks along a first path; analyzing means for said marks arranged in said first path; means for feeding a record sheet along a second path; a printing mechanism controlled by said analyzing means and being set by the same for printing data represented by marks in said record cards, said printing mechanism including first printing means located in said first path for printing record cards and second printing means located in said second path for printing said record sheet; control means for selectively actuating said first and second printing means so as to selectively associate said printing mechanism with each of said paths for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; and actuating means for said selecting mechanism and being connected to said control means and operated by the same to move said selecting mechanism to said operative position when said control means actuate said second printing means and associate said printing mechanism with said second path, and to move said selecting mechanism to said inoperaive position when said control means actuate said first printing means and associate said printing mechanism with said first path so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards.

6. In a record card controlled printing machine, in combination, means for feeding record cards bearing marks in a feeding direction along a first path; analyzing means for said marks arranged in said first path; deflecting means for said record cards located in said first path behind said analyzing means in said feeding direction for selectively guiding record cards to two final positions; means for feeding a record sheet along a second path; a printing mechanism controlled by said analyzing means and being set by the same for printing data represented by marks in said record cards; control means for selectively associating said printing mechanism with each of said paths for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; and actuating means for said selecting mechanism and being connected to said control means and operated by the same to move said selecting mechanism to said operative position when said control means associate said printing mechanism with said second path, and to move said selecting mechanism to said inoperative position when said control means associate said printing mechanism with said first path so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards, said deflecting means being controlled by said selecting mechanism in said operative position of the same to guide record cards selected by said selecting mechanism into one of said final positions and to guide the other record cards fed along said first path into the other final position.

7. In a record card controlled printing machine, in combination, means for feeding record cards bearing marks along a first path; analyzing means for said marks arranged in said first path; deflecting means for said record cards located in said first path behind said analyzing means in feeding directions for selectively guiding record cards to two final positions; means for feeding a record sheet along a second path a printing mechanism controlled by said analyzing means and being set by the same for printing data represented by marks in said record cards, said printing mechanism being common to the record cards and to the record sheet and being movable between a first position located in said first path and a second position located in said second path; control means for shifting said printing mechanism between said first and second positions for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism; means for automatically rendering said selecting mechanism ineffective when said printing mechanism is in said first position; and means for rendering said selecting mechanism effective when said printing mechanism is in said second position for printing all record cards passing said analyzer means, said deflecting means being controlled by said selecting mechanism in said operative position of the same to guide record cards selected by said selecting mechanism into one of said final positions and to guide the other record cards fed along said first path into the other final position.

8. In a record card controlled printing machine, in combination, means for feeding record cards bearing marks along a first path; analyzing means for said marks arranged in said first path; means for feeding a record sheet along a second path parallel to said first path; a printing mechanism controlled by said analyzing means and being set by the same for printing data represented by marks in said record cards, said printing mechanism being common to the record cards and to the record sheet and being movable in a direction transverse to said first and second paths between a first position located in said first path and a second position located in said second path; control means for shifting said printing mechanism between said first and second positions for selectively printing on said record cards and on said record sheet, respectively; a manually operated selecting mechanism settable to a plurality of selecting positions corresponding to code marks on said record cards, said selecting mechanism being connected to said analyzing means for selecting cards on which the position of code marks analyzed by said analyzing means agrees with the selecting position set on said selecting mechanism, said selecting mechanism being movable between an inoperative position and a card-selecting operative position; an actuating means for said selecting mechanism and being connected to said control means and operated by the same to move said selecting mechanism to said operative position when said printing mechanism is in said second position and to move said selecting mechanism to said inoperative position when said printing mechanism is in said first position so that in said operative position of said selecting mechanism data represented by marks on record cards selected by said selecting mechanism are printed on said record sheet while in said inoperative position of said selecting mechanism said printing mechanism prints on all record cards passing said analyzing means the data represented by marks on the respective record cards.

9. In a record card controlled printing machine, in combination, feeding means for feeding record cards along a feeding path; analyzing means located in said feeding path for analyzing marks in the record cards; a printing mechanism controlled by said analyzing means and set by the same to print data represented by marks in said record cards; a manually operated selecting mechanism settable to a plurality of selecting positions corresponding to code marks on said record cards and being connected to said analyzing means for selecting record cards on which the position of code marks analyzed by said analyzing means agrees with the selecting position set on said selecting mechanism; operating means controlled by said selecting mechanism for driving said feeding means at a lower printing speed when said selecting mechanism selects a record card for printing, and for driving said feeding means at a higher analyzing speed until a record card is selected by said selecting mechanism.

10. In a record card controlled printing machine, in combination, feeding means for feeding record cards along a feeding path; analyzing means located in said feeding path for analyzing marks in the record cards; a printing mechanism controlled by said analyzing means and set by the same to print data represented by marks in said record cards; first drive means for driving said printing means; second drive means for selectively driving said feeding means at a lower printing speed corresponding to the speed of said printing means and at a higher analyzing speed; a manually operated selecting mechanism settable to a plurality of selecting positions corresponding to code marks on said record cards and being connected to said analyzing means for selecting record cards on which the position of code marks analyzed by said analyzing means agrees with the selecting position set on said selecting mechanism; actuating means controlled by said selecting mechanism and being connected to said first and second drive means to simultaneously actuate said first drive means to drive said printing means, and said second drive means to drive said feeding means at said lower printing speed when said selecting mechanism selects a record card for printing, said actuating means actuating said second drive means to drive said feeding means at said higher analyzing speed until a record card is selected by said selecting mechanism.

11. In a record card controlled printing machine, in combination, feeding means for feeding record cards along a feeding path; analyzing means located in said feeding path for analyzing marks in the record cards; a printing mechanism; setting means connecting said printing mechanism with said analyzing means for setting said printing mechanism to print data represented by marks in said record cards, said setting means being movable between a disconnecting position disconnecting said printing mechanism from said analyzing means and a connecting position connecting said printing mechanism with said analyzing means; first drive means for driving said printing means; second drive means for selectively driving said feeding means at a lower printing speed corresponding to the speed of said printing means and at a higher analyzing speed; a manually operated selecting mechanism settable to a plurality of selecting positions corresponding to code marks on said record cards and being connected to said analyzing means for selecting record cards on which the position of code marks analyzed by said analyzing means agrees with the selecting position set on said selecting mechanism; actuating means controlled by said selecting mechanism and connected to said setting means to move said setting means to said connecting position, and being connected to said first and second drive means to simultaneously actuate said first drive means to drive said printing means, and said second drive means to drive said feeding means at said lower printing speed when said selecting mechanism selects a record card for printing, said actuating means actuating said second drive means to drive said feeding means at said higher analyzing speed and holding said setting means in said disconnecting position until a record card is selected by said selecting mechanism.

12. In a record card controlled printing machine, in combination, feeding means for feeding record cards along a feeding path; analyzing means located in said feeding path and including a row of analyzers arranged across said feeding path, each analyzer being associated with one card column for analyzing marks in the record cards index position by index position; a printing mechanism located in said feeding path and controlled by said analyzing means and set by the same during the analysis of subsequent index positions to print data represented by marks in said record cards; first drive means for driving said printing means; second drive means for selectively driving said feeding means at a lower printing speed corresponding to the speed of said printing means and at a higher analyzing speed; a manually operated selecting mechanism settable to a plurality of selecting positions corresponding to code marks on said record cards and being connected to said analyzing means for selecting record cards on which the position of code marks analyzed by said analyzing means agrees with the selecting position set on said selecting mechanism; actuating means controlled by said selecting mechanism and being connected to said first and second drive means to simultaneously actuate said first drive means to drive said printing means, and said second drive means to drive said feeding means at said lower printing speed when said selecting mechanism selects a record card for printing, said actuating means actuating said second drive means to drive said feeding means at said higher analyzing speed until a record card is selected by said selecting mechanism.

13. In a record card controlled printing machine, in combination, feeding means for feeding record cards along a feed path; analyzing means for analyzing marks in the record cards and located in said feeding path, said analyzer means including a first set of analyzers and a second set of analyzers; a printing mechanism located in said feeding path and being controlled by said first set of analyzers for being set by the same to print data represented by marks in said record cards; a manually operated selecting mechanism settable to a plurality of selecting positions corresponding to code marks on said record cards and being connected to said second set of analyzers for selecting record cards on which the position of code marks agrees with the selecting position set on said selecting mechanism; operating means controlled by said selecting mechanism for driving said feeding means at a lower printing speed when said selecting mechanism selects a record card for printing, and for driving said feeding means at a higher analyzing speed until a record card is selected by said selecting mechanism; and means controlled by said operating means for actuating said printing mechanism when a selected record card is fed to said first set of analyzers.

14. In a record card controlled printing machine, in combination, feeding means for feeding record cards along a feed path; analyzing means for analyzing marks in the record cards and located in said feeding path, said analyzer means including a first set of analyzers and a second set of analyzers; a printing mechanism located in said feeding path; setting means connecting said printing mechanism with said first set of analyzers so that said printing mechanism is set by the latter to print data represented by marks in said record cards, said setting means being movable between a disconnecting position disconnecting said printing mechanism from said first set of analyzers and a connecting position connecting said printing mechanism with said first set of analyzers; a manually operated selecting mechanism settable to a plurality of selecting positions corresponding to code marks on said record cards and being connected to said second set of analyzers for selecting record cards on which the position of code marks agrees with the selecting position set on said selecting mechanism; operating means controlled by said selecting mechanism for driving said feeding means at a lower printing speed and to simultaneously move said setting means to said connecting position when said selecting mechanism selects a record card for printing, and for driving said feeding means at a higher analyzing speed and for simultaneously moving said setting means to said disconnecting position until a record card is selected by said selecting mechanism; and means controlled by said operating means for actuating said printing mechanism when a selected record card is fed to said first set of analyzers.

15. In a record card controlled printing machine, in combination, first feeding means for feeding record cards bearing marks along a first path; analyzing means for said marks arranged in said first feeding path; second feeding means for feeding a record sheet along a second path; a printing mechanism controlled by said analyzing means and being set by the same; control means for selectively associating said printing mechanism with each of said paths for selectively printing on said record cards and on said record sheet, respectively; a manually operated selecting mechanism settable to a plurality of selecting positions corresponding to code marks on said record cards and being connected to said analyzing means for selecting record cards on which the position of code marks analyzed by said analyzing means agrees with the selecting position set on said selecting mechanism, said selecting mechanism being movable between an inoperative position and an operative card selecting position; actuating means for said selecting mechanism and being connected to said control means and operated by the same to move said selecting mechanism to said operative card selecting position when said control means associate said printing mechanism with said second path, and to move said selecting mechanism to said inoperative position when said control means associate said printing mechanism with said first path; and operating means controlled by said selecting mechanism for driving said first feeding means at a lower printing speed when said selecting mechanism in said operative position selects a record card for printing, and for driving said feeding means at a higher analyzing speed until a record card is selected by said selecting mechanism.

16. In a record card controlled printing machine, in combination, first feeding means for feeding record cards bearing marks along a first path; analyzing means for said marks arranged in said first feeding path; second feeding means for feeding a record sheet along a second path, said analyzing means including a first set of analyzers and a second set of analyzers; a printing mechanism controlled by said first set of analyzers and being set by the same; control means for selectively associating said printing mechanism with each of said paths for selectively printing on said record cards and on said record sheet, respectively; a manually operated selecting mechanism settable to a plurality of selecting positions corresponding to code marks on said record cards and being connected to said second set of analyzers for selecting record cards on which the position of code marks agrees with the selecting position set on said selecting mechanism, said selecting mechanism being movable between an inoperative position and an operative card selecting position; actuating means for said selecting mechanism and being connected to said control means and operated by the same to move said selecting mechanism to said operative card selecting position when said control means associate said printing mechanism with said second path, and to move said selecting mechanism to said inoperative position when said control means asociate said printing mechanism with said first path; operating means controlled by said selecting mechanism for driving said first feeding means at a lower printing speed when said selecting mechanism in said operative position selects a record card for printing, and for driving said feeding means at a higher analyzing speed until a record card is selected by said selecting mechanism; and means controlled by said operating means for actuating said printing mechanism when a selected record card is fed to said first set of analyzers.

References Cited in the file of this patent

UNITED STATES PATENTS

| | | |
|---|---|---|
| 1,506,382 | Pierce | Aug. 26, 1924 |
| 1,651,179 | Bryce | Nov. 29, 1927 |
| 1,862,032 | Pierce | June 7, 1932 |
| 1,962,735 | Ford | June 12, 1934 |
| 1,965,981 | Lake | July 10, 1934 |
| 2,003,636 | Maul | June 4, 1935 |
| 2,168,763 | Daly | Aug. 8, 1939 |
| 2,335,949 | Lewis | Dec. 7, 1943 |
| 2,412,527 | Mills | Dec. 10, 1946 |